Figure 1:
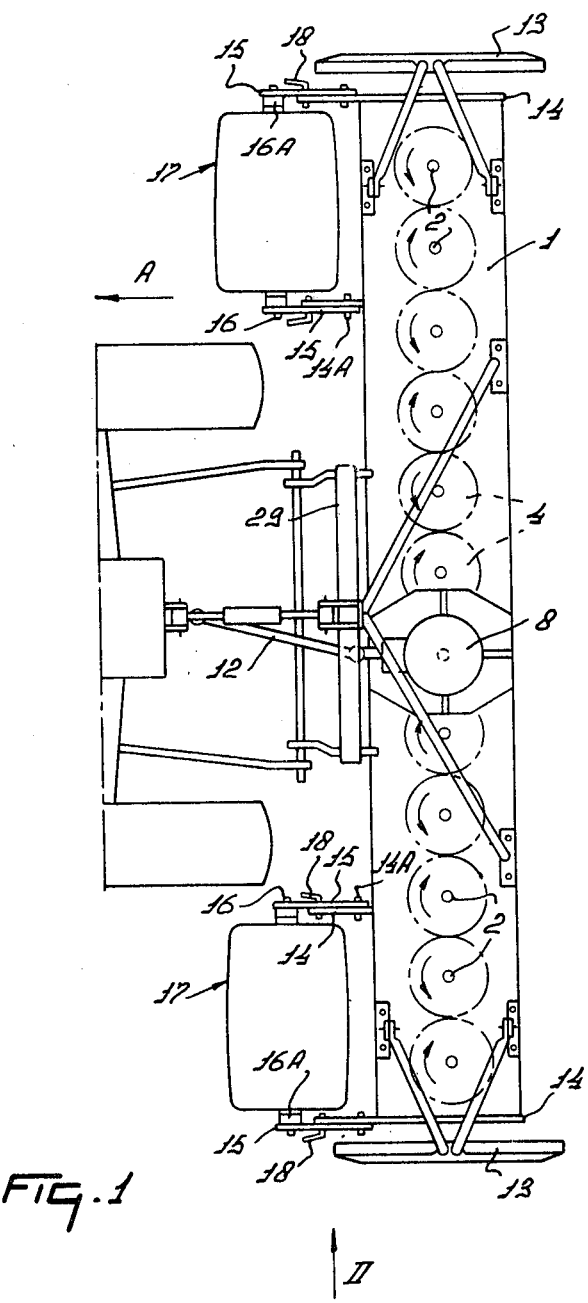

United States Patent [19]
van der Lely

[11] 3,951,213
[45] Apr. 20, 1976

[54] ROTARY HARROWS

[76] Inventor: Cornelis van der Lely, 7, Bruschenrain, Zug, Switzerland

[22] Filed: Sept. 30, 1974

[21] Appl. No.: 510,164

Related U.S. Application Data

[63] Continuation of Ser. No. 350,200, April 11, 1973, abandoned.

[30] Foreign Application Priority Data

Apr. 19, 1972 Netherlands..................... 7205221

[52] U.S. Cl................................... 172/59; 172/78; 172/421
[51] Int. Cl.²..................... A01B 33/06; A01B 65/06
[58] Field of Search ................... 172/59, 76, 77, 78, 172/79, 111, 395, 669, 670, 676, 421; 280/DIG. 7, 43

[56] References Cited
UNITED STATES PATENTS

| | | | |
|---|---|---|---|
| 1,533,918 | 4/1925 | Kast................................ | 172/421 X |
| 3,559,747 | 2/1971 | Cline................................ | 172/421 |
| 3,616,862 | 11/1971 | van der Lely..................... | 172/59 X |
| 3,774,688 | 11/1973 | van der Lely et al............. | 172/59 X |
| 3,774,689 | 11/1973 | van der Lely et al........... | 172/776 X |

FOREIGN PATENTS OR APPLICATIONS 1,011,805  12/1965  United Kingdom................... 172/78

OTHER PUBLICATIONS

Terra–Tires AD, Popular Science, Dec. 1957, p. 129.
Terra–Tires AD, SAE Journal, Mar. 1959, p. 13.

*Primary Examiner*—George J. Marlo
*Attorney, Agent, or Firm*—Mason, Mason & Albright

[57] ABSTRACT

A harrow has side-by-side rotary soil working members mounted on upright shafts which are journalled in a frame portion that extends transverse to the direction of travel. Supporting members are pivoted to the harrow's frame in front of the soil working members and at each end of the frame portion. The supporting members have a wide ground engaging surface that is at least equal in width to the distance between adjacent shafts for the soil working members. The supporting members may be in the form a wheel with a low pressure tire, a wheel with a cage-like construction and longitudinal bars, or a skid with a ground-engaging surface of convex configureation.

8 Claims, 5 Drawing Figures

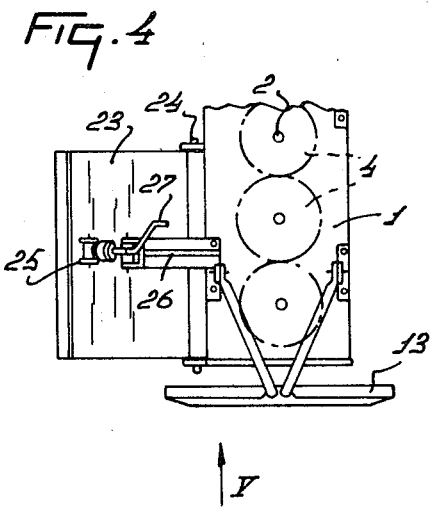
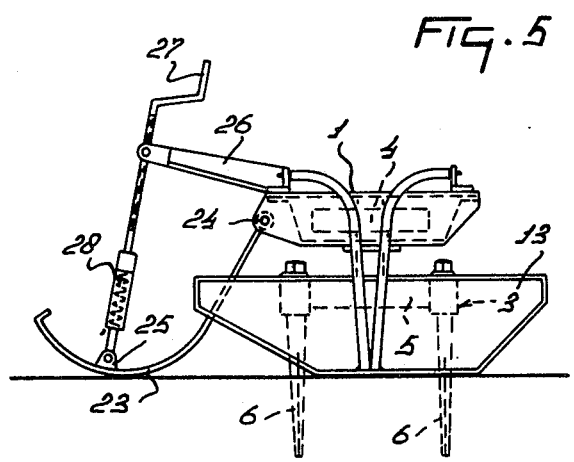

ROTARY HARROWS

This is a continuation of Ser. No. 350,200 filed Apr. 11, 1973, now abandoned.

This invention relates to rotary harrows, such harrows being of the kind comprising a frame portion that extends transverse to the intended direction of operative travel of the harrow, a plurality of soil working members or rotors carried by said frame portion so as to be capable of revolving about upwardly extending axes, and at least one supporting member arranged to sustain the harrow from the ground surface during the use of the harrow, said supporting member being located adjacent one end of the frame portion and wholly or principally in front of the latter with respect to said direction of operative travel.

According to the present invention, there is provided a rotary harrow of the kind set forth, wherein the or each supporting member has a supporting surface whose width in a direction perpendicular to the intended direction of operative travel of the harrow is not less than the perpendicular distance between the axes of rotation of two neighbouring soil working members or rotors of the harrow.

The term "supporting surface" is to be interpreted as meaning that part of the corresponding supporting member which bears against the ground surface during operation of the harrow.

Figure 2:
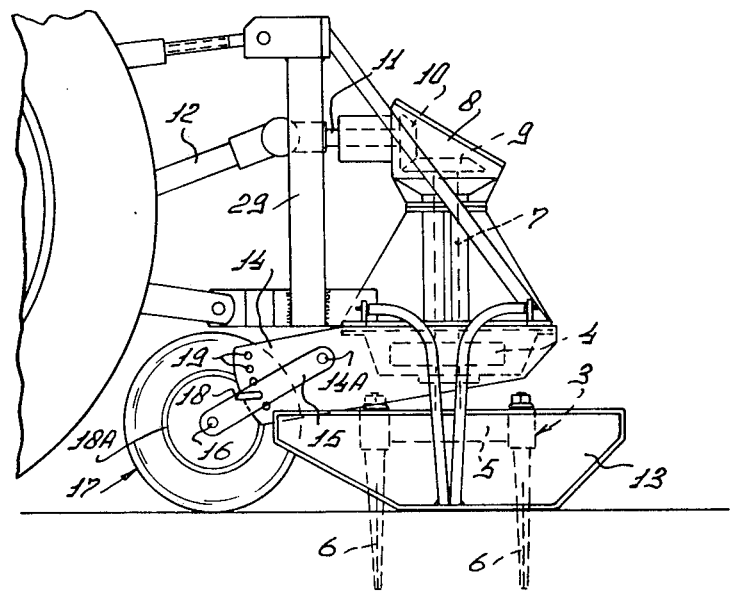
Figure 3:
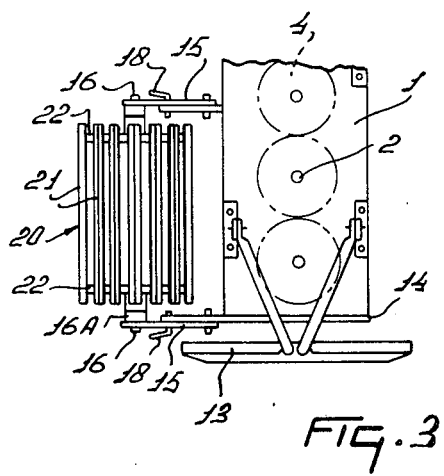

For a better understanding of the invention, and to show how the same may be carried into effect, reference will now be made, by way of example, to the accompanying drawings, in which:

FIG. 1 is a plan view of a rotary harrow in accordance with the invention coupled to the rear of an agricultural tractor, FIG. 2 is a side elevation, to an enlarged scale, as seen in the direction indicated by an arrow II in FIG. 1, FIG. 3 is a partial plan view of a rotary harrow in accordance with the invention illustrating the provision of alternative parts to those illustrated in FIGS. 1 and 2, FIG. 4 corresponds to FIG. 3 but shows a further alternative construction, and FIG. 5 is a side elevation, to an enlarged scale, as seen in the direction indicated by an arrow V in FIG. 4.

Referring to FIGS. 1 and 2 of the drawings, the rotary harrow that is illustrated has a frame that is afforded principally by a hollow box-shaped frame portion 1 that extends substantially horizontally perpendicular to the intended direction of operative travel of the harrow that is indicated by an arrow A in FIG. 1. The frame portion 1 accommodates a single row of upright or substantially vertical rotary shafts 2 that are regularly spaced apart from one another by distances which it is preferred should be substantially 25 centimeters. Each shaft 2 is rotatably supported by corresponding substantially vertical bearings that are carried at the top and the bottom of the frame portion 1 but that are not shown in detail in the accompanying drawings, the upper bearings being fastened to at least one substantially horizontal cover plate of the frame portion 1 which cover plate of the frame portion 1 is marginally secured by small bolts (not shown) to rims of the profiled underlying remainder of the frame portion 1. Each shaft 2 is provided, inside the frame portion 1 and between the corresponding upper and lower bearings, with a straight- or spur-toothed pinion 4, the pinions 4 (of which there are twelve in the illustrated embodiment) being arranged in such a way that the teeth of each of them are in mesh with those of its neighbour, or each of its two neighbours, in the single row thereof.

Each rotary shaft 2 forms part of a corresponding soil working member or rotor 3 and it will be seen from FIG. 2 of the drawings that the lowermost end of each shaft 2 carries a substantially horizontal tine support 5 whose opposite ends are provided with substantially vertically disposed sleeve-like tine holders in which upper fastening portions of soil-working tines 6 are secured. The tines 6 have lower downwardly tapering soil working portions that penetrate into the ground to break up the latter and produce a seed bed upon movement of the harrow over a field in the direction A with the shafts 2 rotating. One of the centre pair of the twelve shafts 2 has an upward extension 7 whose upper end is located inside a gear box 8 carried by a support mounted on top of the frame portion 1. The shaft extension 7 is provided inside the gear box 8 with a bevel pinion 9 whose teeth are in driven mesh with those of a smaller bevel pinion 10 secured inside the gear box 8 to one end of a substantially horizontal rotary input shaft 11 the opposite splined or otherwise keyed end of which projects forwardly from the gear box 8 in substantially the direction A. The end of the rotary input shaft 11 which has just been mentioned is intended to be placed in driven connection with the power take-off shaft of an agricultural tractor or other operating vehicle in substantially the manner that is shown in FIGS. 1 and 2 of the drawings with the aid of a telescopic transmission shaft 12 of known construction having universal joints at its opposite ends. Two substantially vertical plates 13 are arranged just beyond the opposite ends of the single row of twelve soil working members or rotors 3 and are connected by arms to pivotal mountings on top of the frame portion 1, said pivotal mountings defining substantially horizontal axes that extend substantially parallel to the direction A. As can be seen in FIG. 2 of the drawings, the plates 13 are shaped to slide over the ground surface during the use of the harrow and their pivotal mountings allow them to move upwardly and downwardly to some extent to match undulations in the surface of the soil over which the harrow travels. The plates 13 serve to minimise the formation of clodridges at the opposite edges of the strips of soil that are worked by the harrow and to reduce the number of stones and other potentially dangerous objects that are flung laterally of the harrow by the rapidly rotating tines 6 when the harrow is in operation. When the harrow is undergoing inoperative transport, the plates 13 can be turned upwardly through substantially 180° about their pivotal connections to the frame portion 1 to lie in inverted inoperative positions on top of that frame portion.

Opposite end regions of the hollow frame portion 1 are provided, at the front with respect to the direction A, with forwardly projecting supports 14 that are spaced apart from one another in a horizontal direction perpendicular to the direction A. Arms 15 are pivotally connected to the supports 14 adjacent the frame portion 1 by horizontally aligned pivot pins 14A that define a substantially horizontal axis that is substantially perpendicular to the direction A. A rotatable supporting member in the form of a broad supporting wheel 17 is rotatably mounted between the leading ends of each pair of arms 15 with the aid of substantially horizontal stub shafts 16 carried by the two broad wheels 17 and co-operating substantially horizontal bearings 16A.

Each broad supporting wheel 17 is thus rotatable about a corresponding substantially horizontal axis defined by the corresponding stub shafts 16 which axes are substantially horizontally perpendicular to the direction A. The outer side or end of each broad supporting wheel 17 (i.e. the end thereof that is furthest from the centre of the harrow) is located substantially in line with the corresponding end of the frame portion 1 with respect to the direction A and also in front thereof with respect to that direction. Each wheel 17 should have a width that is at least equal to the perpendicular distance between two neighbouring rotary shafts 2 (i.e. a distance of substantially 25 centimeters) and it can be seen from FIG. 1 of the drawings that, in the example which is being described, said width is actually greater than twice that distance. Each broad supporting wheel 17 is provided with a low-pressure tyre that is mounted on a rim or felly 18A so that the whole wheel can rotate freely between the leading ends of the arms 15 about the axis defined by the stub shafts 16. The leading end of each support 14 is formed with an arcuately curved row of holes 19, each hole being equidistant from the axis defined by the pivot pins 14A. Each arm 15 carries a substantially horizontal locking pin 18 and its tip can be entered in any chosen one of the corresponding row of holes 19 to maintain the arm 15 by which it is carried in a corresponding angular setting about the axis defined by the pivot pins 14A. The axes of rotation of the broad supporting wheels 17 are thus upwardly and downwardly adjustable relative to the frame portion 1 and it will be evident from FIG. 2 of the drawings that the particular holes 19 that are chosen to co-operate with the locking pins 18 are a principal factor in determining the depth of penetration of the tines 6 into the soil in the use of the harrow.

FIG. 3 of the drawings shows an alternative construction in which each rotatable supporting member (of which only one is visible in FIG. 3) is afforded by a wheel or roller cage 20 that is rotatably mounted between the leading ends of the corresponding pair of arms 15 in the same manner as has been described above for the broad supporting wheels 17. Each wheel or roller cage 20 comprises two substantially vertical discs 22 that are fastened to the corresponding stub shafts 16 and a plurality, such as twelve, of regularly spaced circumferential bars 21 each of which extends substantially parallel to the axis of rotation defined by the stub shafts 16 and each of which is fastened, close to its opposite ends, to the periphery of the two discs 22. As in the preceding embodiment, each wheel or roller cage 20 has a supporting surface whose width should not be less than the perpendicular distance between two neighbouring rotary shafts 2, said distance preferably being, as illustrated, equal to two or more times the perpendicular distance which has just been mentioned.

FIGS. 4 and 5 of the drawings illustrate an embodiment in which two supporting members (of which only one is illustrated) each take the form of a sliding shoe or skid 23 the supporting width of which is again not less than the perpendicular distance between two neighbouring rotary shafts 2 and is preferably equal to at least twice that perpendicular distance. As can be seen in FIG. 5 of the drawings, the lower surface of the illustrated shoe or skid 23 is of convex configuration, the construction being such that the leading end of each shoe or skid is spaced above the ground so that no large accumulations of mud or loose material lying upon the ground are brought about. The illustrated shoe or skid 23 is turnable relative to lugs projecting forwardly from the frame portion 1 about a substantially horizontal axis afforded by a shaft 24 and the shoe or skid 23 is angularly adjustable about the axis defined by said shaft 24 with the aid of a crank and screw-threaded spindle 23 whose screw-threaded shank is entered through a correspondingly screw-threaded block pivotally mounted at the leading end of an arm 26 that projects forwardly from an anchorage on the top of the frame portion 1. The lowermost end of the shank of the spindle 27 is pivotally connected to a pair of lugs 25 on the upper concave surface of the shoe or skid 23 through the intermediary of a spring assembly 28 which is so arranged that the shoe or skid 23 can deflect upwardly against the resilient opposition of the assembly 28 about a substantially horizontal axis that is substantially perpendicular to the direction A during the operation of the harrow to match undulations in the surface of the soil and to negotiate any obstacles which it may meet.

In the use of the rotary harrow that has been described, a generally triangular coupling member 29 mounted centrally at the front of the frame portion 1 is coupled to the three-point lifting device or hitch of an operating tractor or other vehicle in the generally known manner that can be seen in outline in FIGS. 1 and 2 of the drawings. The rotary input shaft 11 is placed in driven connection with the power take-off shaft of the same tractor or other operating vehicle by means of the intermediate telescopic transmission shaft 12 in the manner described above. It will be seen from FIGS. 1 and 2 of the drawings that, when the harrow is connected to the three-point lifting device or hitch, the broad supporting wheels 17 or other supporting members are located substantially alongside rear regions of the rear wheels of the operating agricultural tractor or other vehicle. As the harrow moves over a field whose soil is to be worked, the soil working members or rotors 3 are rotated in the directions indicated by arrows in FIG. 1 of the drawings through the intermediary of the gear box 8 and the pinions 4. The harrow is sustained from the ground surface by the supporting members 17, 20 or 23 each of which members has an effective supporting width that is not less than the perpendicular distance between the axes of rotation of two neighbouring rotary shafts 2. The constructions which have been described ensure good stability of the harrow even when working on very soft land, the arrangement of the supporting members at the front of the frame portion 1 and adjacent the opposite lateral ends thereof having the result that no appreciable additional loads are exerted upon the three-point lifting device or hitch of the agricultural tractor or other operating vehicle; nor do any difficulties result from the described constructions when the harrow is to be inoperatively transported from one site to another. Such transport will normally be undertaken with the three-point lifting device or hitch of the operating tractor or other vehicle raised to bring the entire harrow clear of contact with the ground. A particularly simple and inexpensive construction results by employing the embodiment that has been described with reference to FIGS. 4 and 5 of the drawings.

Although various features of the rotary harrows that have been described and/or illustrated in the accompanying drawings will be set forth in the following claims as inventive features, it is emphasised that the invention is not necessarily limited to those features and that it includes within its scope all of the parts of each rotary harrow that has been described and/or illustrated both individually and in various combinations.

What we claim is:

1. A rotary harrow comprising a frame having an elongated frame portion extending transverse to the normal direction of travel and a plurality of rotary soil-working members mounted on upwardly extending shafts in a row, said shafts being supported on said frame portion and drive means connected to the shafts to rotate said soil-working members, a supporting member on arm means being connected to said harrow adjacent each lateral end of the frame portion, said arm means with said supporting member extending forwardly of the front of said portion and providing substantially the sole ground engaging supporting surface of the harrow to control the working depth of said soil working members, said supporting member having a supporting ground engaging surface with a width that at least equals the distance between two adjacent shafts, said arm means including a pair of arms and each supporting member having an outer arm substantially in register with a corresponding lateral end of said frame portion, said supporting member being entirely and directly located in front of said frame portion.

2. A harrow as claimed in claim 1, wherein said arm means is pivoted to the harrow.

3. A harrow as claimed in claim 2, wherein said arms are spaced apart and said supporting member is turnable about a substantial horizontal axis that extends transverse to the direction of travel of said harrow.

4. A harrow as claimed in claim 2, wherein said arms have retaining means for retaining said supporting member at any chosen one of a plurality of different levels relative to said frame portion.

5. A harrow as claimed in claim 2, wherein said supporting member is a wheel having a low pressure tire.

6. A harrow as claimed in claim 4, wherein pairs of forwardly projecting supports are secured to said frame portion and each supporting member is connected to its corresponding pair of supports through two spaced apart arms of said arm means, said arms being pivoted to said supports and each supporting member being located between its corresponding pair of supports.

7. A harrow as claimed in claim 2, wherein said supporting member is a wheel with a cage-like construction and longitudinal bars.

8. A harrow as claimed in claim 1, wherein each supporting member is a skid with a ground-engaging surface of convex configuration, the leading end of each skid, with respect to the direction of travel, being located above the ground surface.

* * * * *